(12) United States Patent
Birchwood (10) Patent No.: US 7,472,022 B2
(45) Date of Patent: Dec. 30, 2008

(54) METHOD AND SYSTEM FOR MANAGING A DRILLING OPERATION IN A MULTICOMPONENT PARTICULATE SYSTEM

(75) Inventor: Richard A. Birchwood, Houston, TX (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 11/847,267

(22) Filed: Aug. 29, 2007

(65) Prior Publication Data

US 2008/0053213 A1    Mar. 6, 2008

Related U.S. Application Data (60) Provisional application No. 60/841,881, filed on Aug. 31, 2006.

(51) Int. Cl.
*G01V 9/00* (2006.01)

(52) U.S. Cl. .............. 702/9; 702/6; 702/11; 700/159; 700/160; 700/173; 73/182.14; 73/152.03

(58) Field of Classification Search ........... 702/6, 702/9, 11; 700/159, 160, 173; 73/152.14, 73/152.01, 152.03, 152.43, 152.54; 175/24, 175/39; 367/25, 35, 86
See application file for complete search history.

(56) References Cited

U.S. PATENT DOCUMENTS

| | | | | |
|---|---|---|---|---|
| 6,044,327 | A * | 3/2000 | Goldman ................ | 702/11 |
| 6,704,656 | B1 * | 3/2004 | Abriol et al. ............ | 702/6 |
| 7,035,778 | B2 * | 4/2006 | Goldman et al. ........ | 703/10 |
| 7,085,696 | B2 * | 8/2006 | King ....................... | 703/10 |
| 7,261,167 | B2 * | 8/2007 | Goldman et al. ........ | 175/39 |
| 7,357,196 | B2 * | 4/2008 | Goldman et al. ........ | 175/24 |
| 7,359,845 | B2 * | 4/2008 | Kelfoun .................. | 703/10 |

OTHER PUBLICATIONS

Eissa, E. A. & Kazi, A.: "Relation between static and dynamic Young's moduli for rocks," Int. J. Rock Mech. Min. Sci. & Geomech. Abstr. 25, 1988, 4 pages.

Montmayour, H. & Graves, R.M.: "Prediction of Static Elastic/Mechanical Properties of Consolidated and Unconsolidated Sands From Acoustic Measurements: Correlations," SPE 15644, 61st Annual Technical Conference and Exhibition of the Society of Petroleum Engineers, New Orleans, L.A, 1986, 16 pages.

(Continued)

*Primary Examiner*—Carol S Tsai
(74) *Attorney, Agent, or Firm*—Dona C. Edwards; Osha Liang L.L.P.

(57) ABSTRACT

In general, the invention relates to a method for managing a drilling operation in a multicomponent particulate system. The method includes obtaining a plurality of geophysical and petrophysical data associated with the multicomponent particulate system, obtaining at least one measurement of an elastoplastic property of the multicomponent particulate system, calculating at least one elastoplastic property of the multicomponent particulate system using the at least one measurement of the elastoplastic property of the multicomponent particulate system, constructing at least one correlation between the at least one elastoplastic property and the at least one property corresponding to the plurality of geophysical and petrophysical data, estimating at least one elastoplastic property of sediments in a formation of interest using the at least one correlation, evaluating mechanical integrity of the formation of interest using the at least one elastoplastic property of sediments, and adjusting the drilling operation based the evaluation.

25 Claims, 5 Drawing Sheets

OTHER PUBLICATIONS

Morales, R.H. & Marcinew, R.P.: "Fracturing of high-permeability formations: Mechanical properties correlations," SPE 26561, 1993, 9 pages.

Yale, D.P. & Jamieson, W.H.: "Static and Dynamic Rock Mechanical Properties in the Hugoton and Panoma Fields, Kansas," SPE 27939, SPE Mid-Continent Gas Symposium, Amarillo, TX, 1994, 11 pages.

TTutuncu, A.N. & Sharma, M.M.: "Relating Static and Ultrasonic Laboratory Measurements to Acoustic Log Measurements in Tight Gas Sands," SPE 24689, 67th Annual Technical Conference and Exhibition of the Society of Petroleum Engineers, Washington, DC, 1992, 13 pages.

Krief, M., Garat, J., Stellingwerff, J., & Ventre, J.: "A petrophysical interpretation using the velocities of P and S waves (full-waveform sonic)," The Log Analyst Nov. 31, 1990, 15 pages.

Chang, C.: "Empirical Rock Strength Logging in Boreholes Penetrating Sedimentary Formations," MULLI-TAMSA (Geophysical Exploration) Jul. 2004, 10 pages.

Plumb, R.A., Herron S.L. & Olsen, M.P.: "Influence of Composition and Texture on Compressive Strength Variations in the Travis Peak Formation," SPE 24758, 67th Annual Technical Conference and Exhibition of the Society of Petroleum Engineers, Washington, D.C., 1992, 14 pages.

Qiu, K., Marsden, J.R., Solovyov, Y., Safdar, M. & Chardac, O.: "Downscaling Geomechanics Data for Thin Bed Using Petrophysical Techniques," SPE 93605, 14th SPE Middle East Oil and Gas Show and Conference, Bahrain, 2005, 11 pages.

Collett, T.S. & Dallimore, S.R.: "Detailed analysis of gas hydrate induced drilling and production hazards," 4th International Conference on Gas Hydrates (ICGH-4), Yokohama, 2002, 6 pages.

Franklin, L.J.: "Hydrates in Arctic Islands" In A.L. Browser (ed.) "Proceedings of a Workshop on Clathrates (gas hydrates) in the National Petroleum Reserve in Alaska," USGS Open-File Report 81-1259, 1981, 12 pages.

Yang, J., Tohidi, B., & Clennell, B. M.: "Micro and macro-scale investigation of cementing characteristics of gas hydrates," AAPG Hedburg Research Conference, Vancouver, Sep. 12-16, 2004, 4 pages.

Darve, F. & Nicot, F.: "On incremental non-linearity in granular media: phenomenological and multi-scale views (Part I)," International Journal for Numerical and Analytical Methods in Geomechanics, 29, 2005, 23 pages.

Emeriault, F. & Claquin, C.: "Statistical homogenization for assemblies of elliptical grains: effect of the aspect ration and particle orientation," International Journal of Solids and Structures, 41, 2004, 13 pages.

Gardiner, B.S. & Tordesillas, A.: "Micromechanics of shear bands," International Journal of Solids and Structures, 41, 2004, 17 pages.

Sayers, C.M.: "Stress-dependent elastic anisotropy of sandstones," Geophysical Prospecting, 50, 2002, 11 pages.

Tordesillas, A. & Walsh, S.: "Incorporating rolling resistance and contact anisotropy in micromechanical models of granular media," Powder Technology, 124, 2002, 23 pages.

Pinson, D., Zou, R.P., Yu, A.B., Zulli, P. & McCarthy, M.J.: "Coordination number of binary mixtures of spheres," J. Phys. D, 31, 1998, 6 pages.

Bardet, J.P. & Proubet, J.: "A numerical investigation of the structure of persistent shear bands in granular media," Geotechnique, 41, 1991, 15 pages.

Dodds, J. A.: "The porosity and contact points in umlticomponent random sphere packings calculated by a simple statistical geometric model," J. Colloid Interface Sci. 77, 1980, 11 pages.

Ouchiyama, N. & Tanaka, T.: "Estimation of the average number of contacts between randomly mixed solid particles," Ind. Eng. Chem. Fundam. 19, 1980, 3 pages.

Suzuki, M. & Oshima, T.: "Co-ordination number of a multicomponent randomly packed bed of spheres with size distribution," Powder Technology, 44, 1985, 6 pages.

Mavko, G., Mukerji, T., and Dvorkin, J.: "The Rock Physics Handbook," Cambridge University Press, 1998, 60 pages.

\* cited by examiner

METHOD AND SYSTEM FOR MANAGING A DRILLING OPERATION IN A MULTICOMPONENT PARTICULATE SYSTEM

CROSS-REFERENCE TO RELATED APPLICATIONS

This application claims benefit of U.S. Provisional Patent Application No. 60/841,881, filed on Aug. 31, 2006, and entitled "Method and System for the Construction of Elastoplastic Property Correlations in Multicomponent Particulate Systems," in the name of the same inventor as the present application.

BACKGROUND

Figure 1:
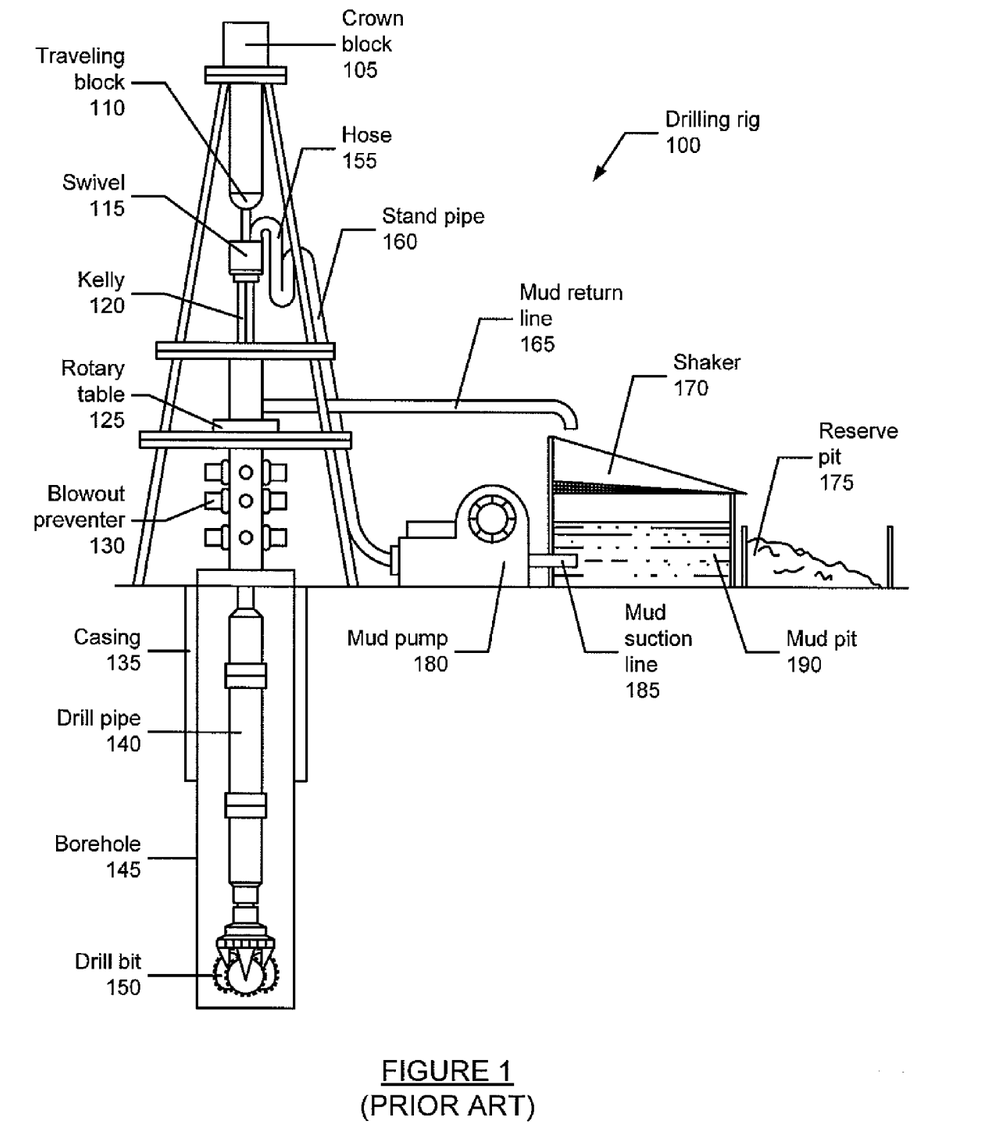
FIG. 1 shows a diagram of a drilling operation.

FIG. 1 shows a diagram of a drilling operation, in which a drilling rig (100) is used to turn a drill bit (150) coupled at the distal end of a drill pipe (140) in a borehole (145). The drilling operation may be used to obtain oil, natural gas, water, or any other type of material obtainable through drilling. Although the drilling operation shown in FIG. 1 is for drilling directly into an earth formation, those skilled in the art will appreciate that other types of drilling operations also exist, such as lake drilling or deep sea drilling.

As shown in FIG. 1, rotational power generated by a rotary table (125) is transmitted from the drilling rig (100) to the drill bit (150) via the drill pipe (140). Further, drilling fluid (also referred to as "mud") is transmitted through the drill pipe's (140) hollow core to the drill bit (150). Specifically, a mud pump (180) is used to transmit the mud through a stand pipe (160), hose (155), and kelly (120) into the drill pipe (140). To reduce the possibility of a blowout, a blowout preventer (130) may be used to control fluid pressure within the borehole (145). Further, the borehole (145) may be reinforced using a casing (135), to prevent collapse due to a blowout or other forces operating on the borehole (145). The drilling rig (100) may also include a crown block (105), traveling block (110), swivel (115), and other components not shown.

Mud returning to the surface from the borehole (145) is directed to mud treatment equipment via a mud return line (165). For example, the mud may be directed to a shaker (170) configured to remove drilled solids from the mud. The removed solids are transferred to a reserve pit (175), while the mud is deposited in a mud pit (190). The mud pump (180) pumps the filtered mud from the mud pit (190) via a mud suction line (185), and re-injects the filtered mud into the drilling rig (100). Those skilled in the art will appreciate that other mud treatment devices may also be used, such as a degasser, desander, desilter, centrifuge, and mixing hopper. Further, the drilling operation may include other types of drilling components used for tasks such as fluid engineering, drilling simulation, pressure control, wellbore cleanup, and waste management.

In a given drilling operation (e.g., the drilling operation shown in FIG. 1), knowledge about the geomechanical properties of formations may be used to mitigate various drilling-related challenges. For example, some formations may present a risk of rock deformation or failure. Plasticity parameters are typically measured directly using mechanical tests performed on cores, while brittle-elastic properties may be predicted using mathematical correlations.

For example, methods for estimating the static Young's modulus are described in: Eissa, E. A. & Kazi, A. (1988) Relation between static and dynamic Young's moduli for rocks. *Int. J. Rock Mech. Min. Sci. & Geomech. Abstr.* 25, 479-482; Montmayour, H. & Graves, R. M. (1986) Prediction of Static Elastic/Mechanical Properties of Consolidated and Unconsolidated Sands From Acoustic Measurements: Correlations. 61*st Annual Technical Conference and Exhibition of the Society of Petroleum Engineers*, New Orleans, La. SPE 15644; Morales, R. H. & Marcinew, R. P. (1993) Fracturing of high-permeability formations: Mechanical properties correlations. SPE 26561; Yale, D. P. & Jamieson, W. H. (1994) Static and Dynamic Rock Mechanical Properties in the Hugoton and Panoma Fields, Kansas. SPE Mid-Continent Gas Symposium, Amarillo, Tex., SPE 27939; and Tutuncu, A. N. & Sharma, M. M. (1992) Relating Static and Ultrasonic Laboratory Measurements to Acoustic Log Measurements in Tight Gas Sands. 67th *Annual Technical Conference and Exhibition of the Society of Petroleum Engineers*, Washington, D.C., SPE 24689.

Further, methods for estimating the static Poisson's ratio from the dynamic Poisson's ratio are described in: Tutuncu & Sharma (1992) (referenced above); and Yale & Jamieson (1994) (referenced above). An empirical correlation for evaluating the Biot's constant is described in Krief, M., Garat, J., Stellingwerff J., & Ventre, J. (1990) A petrophysical interpretation using the velocities of P and S waves (full-waveform sonic). *The Log Analyst* 31, November, 355-369.

Moreover, correlations for estimating the unconfined compressive strength of rocks have been devised by several authors and are reviewed in Chang, C. (2004) Empirical Rock Strength Logging in Boreholes Penetrating Sedimentary Formations. MULLI-TAMSA (*Geophysical Exploration*) 7, 174-183. Additional correlations for this purpose are described in: Plumb, R. A., Herron S. L. & Olsen, M. P. (1992) Influence of Composition and Texture on Compressive Strength Variations in the Travis Peak Formation. 67th *Annual Technical Conference and Exhibition of the Society of Petroleum Engineers*, Washington, D.C. SPE 24758; and Qiu, K., Marsden, J. R., Solovyov, Y., Safdar, M. & Chardac, O. (2005) Downscaling Geomechanics Data for Thin Bed Using Petrophysical Techniques. 14*th SPE Middle East Oil and Gas Show and Conference*, Bahrain. SPE 93605.

SUMMARY

In general, in one aspect, the invention relates to a method for managing a drilling operation in a multicomponent particulate system. The method includes obtaining a plurality of geophysical and petrophysical data associated with the multicomponent particulate system. The plurality of geophysical and petrophysical data includes geophysical and petrophysical properties of a first type of particle in the multicomponent particulate system, acoustic velocities measured in the multicomponent particulate system, and effective confining pressure of the multicomponent particulate system. The method further includes calculating at least one property corresponding to the plurality of geophysical and petrophysical data, obtaining at least one measurement of an elastoplastic property of the multicomponent particulate system, calculating at least one elastoplastic property of the multicomponent particulate system using the at least one measurement of the elastoplastic property of the multicomponent particulate system, constructing at least one correlation between the at least one elastoplastic property and the at least one property corresponding to the plurality of geophysical and petrophysical data, estimating at least one elastoplastic property of sediments in a formation of interest using the at least one correlation, evaluating mechanical integrity of the formation of interest using the at least one elastoplastic property of sediments, and adjusting the drilling operation based the evaluation.

In general, in one aspect, the invention relates to a system associated with a drilling operation in a multicomponent particulate system. The system includes at least one measuring mechanism configured to obtain a plurality of geophysical and petrophysical data associated with the multicomponent particulate system. The plurality of geophysical and petrophysical data includes geophysical and petrophysical properties of a first type of particle in the multicomponent particulate system, acoustic velocities measured in the multicomponent particulate system, and effective confining pressure of the multicomponent particulate system. The system further includes a data analysis system configured to calculate at least one property corresponding to the plurality of geophysical and petrophysical data, obtain at least one measurement of an elastoplastic property of the multicomponent particulate system, calculate at least one elastoplastic property of the multicomponent particulate system using the at least one measurement of the elastoplastic property of the multicomponent particulate system, construct at least one correlation between the at least one elastoplastic property and the at least one property corresponding to the plurality of geophysical and petrophysical data, estimate at least one elastoplastic property of sediments in a formation of interest using the at least one correlation and evaluate mechanical integrity of the formation of interest using the at least one elastoplastic property of sediments, wherein the drilling operation is adjusted based on the evaluation.

In general, in one aspect, the invention relates to a computer readable medium comprising computer program code for managing a drilling operation in a multicomponent particulate system. The computer program code comprising instructions to: obtain a plurality of geophysical and petrophysical data associated with the multicomponent particulate system. The plurality of geophysical and petrophysical data includes geophysical and petrophysical properties of a first type of particle in the multicomponent particulate system, acoustic velocities measured in the multicomponent particulate system, and effective confining pressure of the multicomponent particulate system. The instructions further include calculate at least one property corresponding to the plurality of geophysical and petrophysical data, obtain at least one measurement of an elastoplastic property of the multicomponent particulate system, calculate at least one elastoplastic property of the multicomponent particulate system using the at least one measurement of the elastoplastic property of the multicomponent particulate system, construct at least one correlation between the at least one elastoplastic property and the at least one property corresponding to the plurality of geophysical and petrophysical data, estimate at least one elastoplastic property of sediments in a formation of interest using the at least one correlation, evaluate mechanical integrity of the formation of interest using the at least one elastoplastic property of sediments, and adjust the drilling operation based the evaluation.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for managing a drilling operation in a multicomponent particulate system (i.e., a formation that includes two or more types of particles). However, the methods described in this invention may also be applied to single component systems. Geophysical, stress, and petrophysical properties of the particulate system are obtained from in situ or laboratory measurements. The choice of appropriate properties is deduced from the science of micromechanics. The geophysical and petrophysical properties referred to here are in general those of the frame but may also include the properties of individual particle types. They may be made dimensionless by appropriate scaling. Properties that characterize the static drained elastoplastic deformation of the particulate system are also similarly obtained and may be converted to dimensionless form. The elastoplastic properties are related to the geophysical, stress, and petrophysical properties via one or more empirical correlations. The empirical correlations are used to estimate the in situ elastoplastic properties of a sedimentary system. These properties are used in models of rock deformation and failure to assess the mechanical integrity of rocks around a borehole drilled in the sedimentary system and the drilling operation is adjusted based on this evaluation.

Micromechanics is the study of composite systems that aims to explain the mechanical behavior of such systems in terms of the behavior of its constitutive parts. Composite systems are those comprised of two or more parts.

Frame properties are those associated with the porous aggregate exclusive of the fluids residing inside the aggregate (interstitial fluids). When measuring frame properties, interstitial fluids are either removed prior to testing or the tests are carried out in such a way as to minimize their influence.

Static properties are those used to characterize the deformation of materials subject to constant or slowly varying loads. In contrast, dynamic properties characterize the deformation of materials subject to rapidly varying loads.

Drained properties are those used to characterize the deformation of materials wherein said deformation is sufficiently slow to allow the interstitial fluid to drain out of the sample without influencing the deformation.

Elastoplastic properties are properties used to model the stress-strain behavior of an elastoplastic material. Such a material exhibits an elastic response at low strains and a plastic response at high strains. During elastic deformation no permanent damage is experienced by the material. This means that when the material is unloaded, it returns to its original state of strain prior to loading. However at sufficient high applied loads, the material becomes plastic, i.e., it experiences permanent damage and will not return to its original state of strain after unloading. Elastoplastic properties are used in constitutive laws that model the stress-strain response of the material in both the elastic and plastic deformation regimes.

Embodiments of the invention may be practiced for a variety of multicomponent particulate systems. For example, drilling operations sometimes target formations that include clathrate hydrates (also referred to in the art as gas clathrate hydrates, gas hydrates, or clathrates). Clathrate hydrates are ice-like crystalline solids composed of a lattice of water molecules. The lattice traps gas or liquid molecules that stabilize the hydrate structure. Methane gas hydrates are the most common naturally occurring species of clathrate hydrate. However, clathrate hydrates including other hydrocarbons such as propane and ethane also exist. Further, non-hydrocarbon substances such as tetrahydrofuran (THF), carbon dioxide ($CO_2$), and hydrogen sulfide ($H_2S$) may be incorporated into the hydrate structure. Clathrate hydrates are prevalent in permafrost regions and in the deeper marine environments of continental margins.

There is increasing interest in drilling in clathrate hydrate zones. For example, clathrate hydrates may be used as an energy source. However, drilling and producing in clathrate hydrate zones may present various challenges. Temperature and pressure disturbances caused by the drilling process may lead to dissociation of clathrate hydrates, resulting in uncontrolled releases of gas into the wellbore, fires, or blowouts. Further, liberated gas may gasify the drilling mud. In some cases, wellbore instability caused by sloughing of sedimentary sections including dissociating clathrate hydrates may result in losing a hole or side tracking. See, e.g., Collett, T. S. & Dallimore, S. R. (2002) Detailed analysis of gas hydrate induced drilling and production hazards. $4^{th}$ *International Conference on Gas Hydrates (ICGH-4)*, Yokohama, May 2002. Even when the consequences are not catastrophic, poor hole conditions may diminish the quality of well logs in clathrate hydrate zones.

Completion and production of wells drilled in clathrate hydrate zones may also present challenges. Poor hole conditions may result in ineffective cement bonding, leading to gas leakage outside the casing. Further, loss of formation competence due to clathrate hydrate removal may cause sand production, formation subsidence, or casing failure. In addition, increased formation pressure may occur in wells completed in clathrate hydrate-bearing zones, because the production of hot hydrocarbons may lead to hydrate dissociation around a cased wellbore. See, e.g., Franklin, L. J. (1981) Hydrates in Artic Islands. In: A. L. Browser (ed.) *Proceedings of a Workshop on Clathrates (gas hydrates) in the National Petroleum Reserve in Alaska*. USGS Open-File Report 81-1259, 18-21.

Those skilled in the art will appreciate that the specific challenges discussed above are provided as examples only, as many other types of challenges exist when drilling in clathrate hydrate zones. Further, while the examples herein emphasize drilling operations in clathrate hydrate zones, similar challenges also exist in other types of multicomponent particulate systems. Moreover, embodiments of the invention may be applied to single component systems or may be extended to multicomponent particulate systems that include more than two components.

Figure 2:
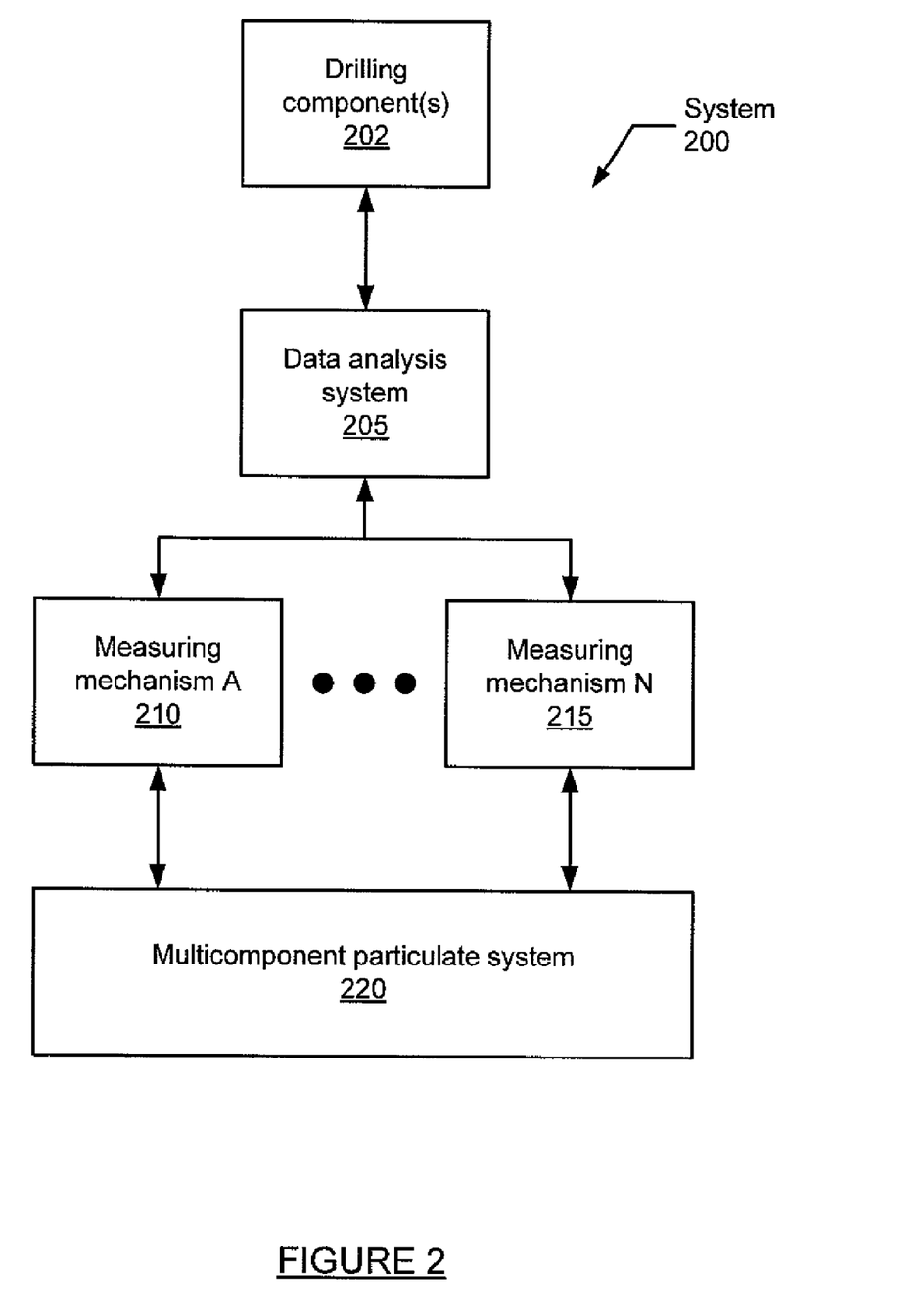
FIG. 2 shows a diagram of a system in accordance with one or more embodiments of the invention.

FIG. 2 shows a diagram of a system (200) in accordance with one or more embodiments of the invention. The system (200) includes one or more measuring mechanisms (e.g., measuring mechanism A (210), measuring mechanism N (215)) configured to measure properties of a multicomponent particulate system (220) to be drilled. Measurements may be carried out on laboratory samples or may be made in situ. Alternatively, measurements may be obtained from a simulation of the multicomponent particulate system (220), or from an actual or simulated formation having a similar composition. Because the multicomponent particulate system (220) includes two or more types of particles, separate measurements may be taken for one or more of the different types of particles.

Those skilled in the art will appreciate that many different measurable properties of multicomponent particulate systems exist, along with a variety of physical and logical mechanisms for obtaining those measurements. As one example, the measuring mechanism(s) may be configured to measure drained elastoplastic properties of the multicomponent particulate system (220) via triaxial load testing or other similar mechanical tests. As another example, the measuring mechanism(s) may be configured to measure geophysical properties (e.g., acoustic wave speeds or bulk density) of the multicomponent particulate system (220) using surface acquisition methods or borehole logging tools.

In one or more embodiments, the measuring mechanism(s) are communicatively coupled with a data analysis system (205). The data analysis system (205) is configured to process the measured properties to calculate macroscopic properties associated with elastoplastic deformation of the multicomponent particulate system (220). These properties include elastoplastic material parameters themselves or properties that are related to them such as geophysical, stress, or petrophysical attributes. A macroscopic property is one that characterizes the gross behavior of a large number of particles. It is assumed that the number of particles is sufficiently large that the sedimentary system can be treated as a continuous material (rather than a set of discrete particles) with gross properties similar to those of a continuous system. These properties represent an "average" of over all components of the system. Further, the data analysis system (205) is configured to construct a correlation (or mathematical relationship) between elastoplastic properties and geophysical, stress, or petrophysical attributes of the system. Calculating a macroscopic property and constructing an elastoplastic property correlation are discussed in detail below.

In one or more embodiments, the elastoplastic property correlation constructed by the data analysis system (205) is used to adjust one or more drilling component(s) (202) of a drilling operation in order to preserve the mechanical integrity of the sediment around the borehole. In one or more embodiments, the drilling component(s) (202) include one or more of the components discussed above, such as a drill bit, mud processing component(s), or casing. First, the elastoplastic property correlations are used to estimate the elastoplastic properties of the formation where drilling is planned. These properties are used as inputs to wellbore stability models designed to evaluate the mechanical integrity of rocks around a borehole. One or more drilling operations are adjusted based on the results of such models. Examples of adjustments include altering the density or viscosity of the mud used to drill the borehole, changing the rate at which mud is circulated through the borehole, changing the rate at which the borehole is drilled, and altering the well trajectory.

Continuing with the discussion of FIG. 2, the data analysis system (205) may be communicatively coupled with the drilling component(s) (202). In such cases, the data analysis system (205) may be configured to adjust the drilling component(s) (202) using an automated process such as an electronic switch signal or remote procedure call. Alternatively, the data analysis system (205) may be configured to present computational results in a human-readable form such as a print out or computer display, and a human operator may manually adjust the drilling component(s) (202) based on those results.

Figure 3:
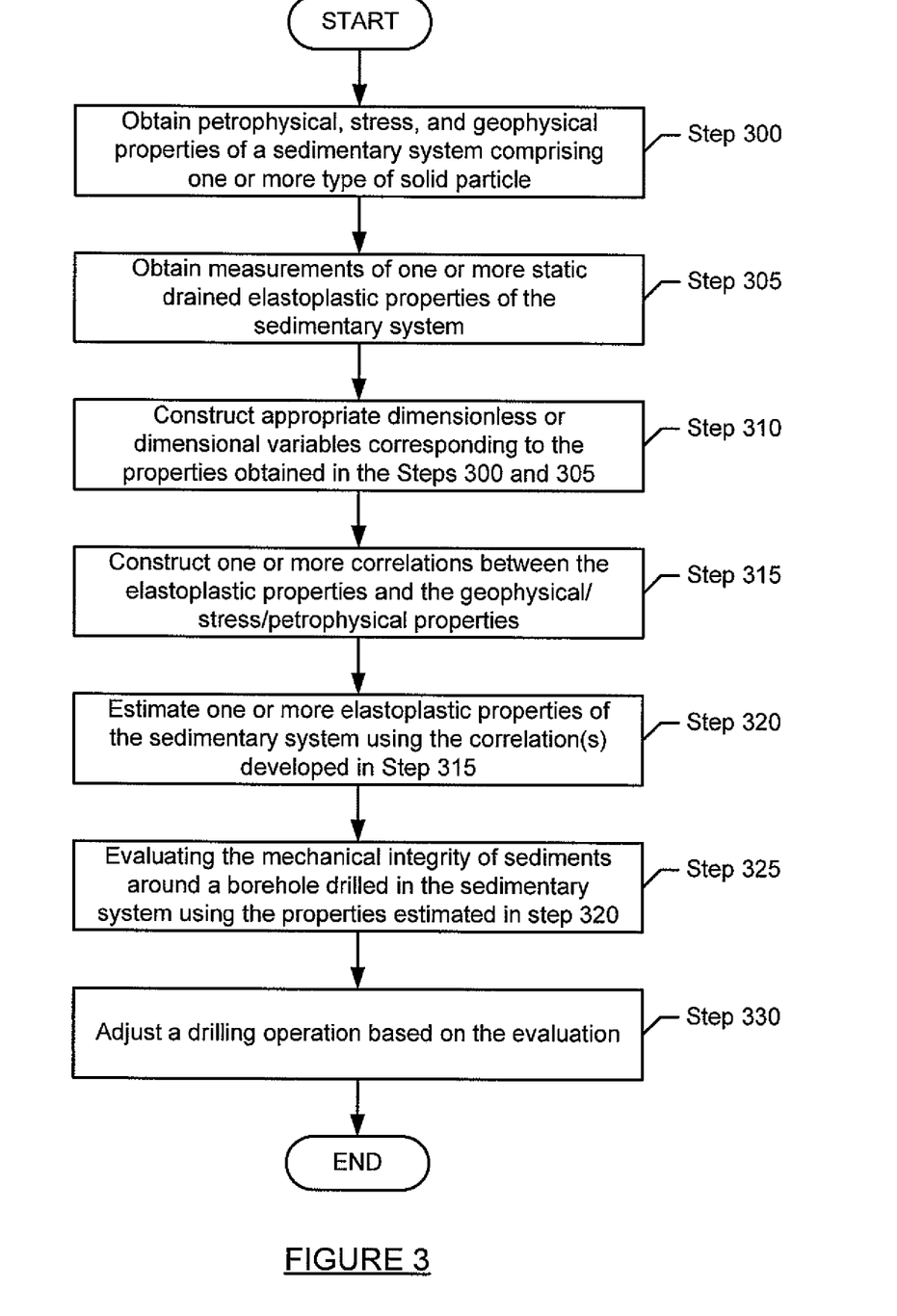
FIG. 3 shows a flowchart of a method for managing a drilling operation in accordance with one or more embodiments of the invention.

FIG. 3 shows a flowchart of a method for managing a drilling operation in accordance with one or more embodiments of the invention. In one or more embodiments, one or more of the steps shown in FIG. 3 may be omitted, repeated, or performed in a different order. Accordingly, the specific arrangement of steps shown in FIG. 3 should not be construed as limiting the scope of the invention.

In Step 300, geophysical, stress, and petrophysical properties of the multicomponent system are obtained. Such properties may correspond to those of the frame or of individual particle types and may be measured by the measuring mechanism(s) discussed above. In particular, the geophysical or petrophysical data may include properties of two or more types of particles in the multicomponent particulate system, and may further include acoustic shear waves measured in the multicomponent particulate system. In Step 305, drained static elastoplastic properties of the multicomponent system are obtained. Such properties may be measured by the measuring mechanism(s) discussed above.

As noted above, the choice of geophysical, stress, and petrophysical properties is governed by micromechanical principles. In Step 310, the properties may be converted to dimensionless form or may be left in their original dimensional form. Similarly static elastoplastic properties may be converted to dimensionless form or be left in their original dimensional form. In Step 315, the elastoplastic properties are related to the petrophysical, stress and geophysical variables via one or more mathematical correlations.

In one or more embodiments, the specific form of the correlation(s) may depend on hydrate saturation levels in the multicomponent particulate system. For example, in a sediment-hydrate system, different forms may be used for low hydrate saturations versus high hydrate saturations. Accordingly, in one or more embodiments, in Step 315, a form for the elastoplastic correlation(s) is selected based on hydrate saturation levels in the multicomponent particulate system. Examples of various forms that may be applied at different hydrate saturation levels are discussed in detail below.

In Step 320, one or more elastoplastic properties are estimated using one of the correlations derived in Step 315. If a saturation-specific correlation was selected in Step 315, that correlation may be used in Step 320 to estimate one or more elastoplastic properties of the multicomponent system. In Step 325, one of more of the elastoplastic properties are estimated in Step 320 are used to model the mechanical integrity of the wellbore. In Step 330, a drilling operation is adjusted based on the results of such modeling.

The following discussion provides an example of the construction of an elastoplastic property correlation such as that performed in Step 315. Those skilled in the art, having benefit of the present disclosure, will appreciate that embodiments of the invention may be envisioned that differ from the following discussion while remaining within the scope of the invention as a whole.

In one or more embodiments, elastoplastic property correlations are based on micromechanical models governing the deformation of granular materials. In the following example, a dry isotopic sediment-hydrate aggregate is assumed, in which clathrate hydrates are taken as particulate in nature. Experiments performed on glass beads that include THF hydrate suggest that this assumption may be reasonable for low to moderate hydrate saturations. See, e.g., Yang, J.,
Tohidi, B., & Clennell, B. M. (2004) Micro and macro-scale investigation of cementing characteristics of gas hydrates. *AAPG Hedburg Research Conference,* Vancouver, Sep. 12-16, 2004.

At high hydrate saturations, the clathrate hydrate may form a continuous matrix. Therefore, aspects of the theoretical analysis discussed below may not be strictly applicable to such cases. However, correlations devised on the basis of theories discussed herein may nonetheless be valid at high hydrate saturations.

In the following discussion, the term 'grain' refers to a mineral grain, and the term 'particle' refers to all constituents of the multicomponent particulate system (e.g., hydrates and grains), unless otherwise specified. Further, the following discussion assumes a simplified, binary model of spherical particles, in which each type of particle (e.g., hydrates and grains) has a uniform diameter and identical physical properties. Those skilled in the art will appreciate that more complex models of particulate systems may be used, in which particles are non-spherical, multi-sized, or variable in other physical properties. Moreover, as noted above, embodiments of the invention may be extended to multicomponent particulate systems that include more than two types of particles.

Aspects of micromechanical models are described in: Darve, F. & Nicot, F. (2005) On incremental non-linearity in granular media: phenomenological and multi-scale views (Part I) *International Journal for Numerical and Analytical Methods in Geomechanics,* 29, 1387-1409; Emeriault, F. & Claquin, C. (2004) Statistical homogenization for assemblies of elliptical grains: effect of the aspect ratio and particle orientation *International Journal of Solids and Structures,* 41, 5837-5849; Gardiner, B. S. & Tordesillas, A. (2004) Micromechanics of shear bands. *International Journal of Solids and Structures,* 41, 5885-5901; Sayers, C. M. (2002) Stress-dependent elastic anisotropy of sandstones. *Geophysical Prospecting,* 50, 85-95; and Tordesillas, A. & Walsh, S. (2002) Incorporating rolling resistance and contact anisotropy in micromechanical models of granular media. *Powder Technology,* 124, 106-111.

A survey and reasoned analysis of the aforementioned literature on micromechanical models suggests that drained dynamic and static deformations may be considered to involve the following physical attributes. The numbering of the physical attributes listed below is merely for the reader's convenience, and should not be construed as limiting the scope of the invention.

1) The particle diameters of the grain ($d_g$) and the hydrate ($d_h$).

2) The densities of the grain ($\rho_g$), the hydrate ($\rho_h$), and the dry aggregate ($\rho_b$). The dry aggregate is comprised of the clathrate hydrate and the mineral grains but contains no interstitial fluids.

3) Inter-granular sliding friction coefficients that govern friction at grain-to-grain contacts ($\mu_{gg}$), hydrate-to-hydrate contacts ($\mu_{hh}$), and grain-to-hydrate contacts ($\mu_{gh}$). In one or more embodiments, these friction coefficients are considered fixed for a given sediment-hydrate combination. Alternatively, a more complex friction model may be used.

4) Cohesion at hydrate-to-hydrate contacts ($c_{hh}$) and at grain-to-hydrate contacts ($c_{gh}$). In one or more embodiments, these cohesion values are each assumed to be constant for a given sediment-hydrate combination. Further, as is generally assumed for unconsolidated sediments, cohesion at grain-to-grain contacts may be treated as negligible or non-existent. Alternatively, a more complex cohesion model may be used.

5) Contact density distribution functions that describe the expectation of finding contacts in a given direction. In this example, four such distributions are used, governing grain-to-grain, grain-to-hydrate, hydrate-to-grain, and hydrate-to-hydrate contacts. In a triaxial test, the contact density distribution functions are independent of orientation in the initial isotropic stress state, prior to axial compression. As axial compression occurs, the contact density distribution functions generally evolve and become dependent on angular orientation. See, e.g., Darve, F. & Nicot, F. (2005) On incremental non-linearity in granular media: phenomenological and multi-scale views (Part I). *International Journal for Numerical and Analytical Methods in Geomechanics*, 29, 1387-1409. However, the evolution described above is wholly determined by the initial contact density distribution functions, the applied stresses, and the properties defined herein. Thus, it may only be necessary to specify the contact density distribution functions in the initial isotropic stress state.

For such states, mean partial coordination numbers and the quantities of various types of particles may be substituted for contact density distribution functions. Thus, the deformation process may be assumed to depend on the number of grains per unit volume ($n_g$), the number of hydrate particles per unit volume ($n_h$), and the mean partial coordination numbers ($N_{gg}$, $N_{gh}$, $N_{hg}$, and $N_{hh}$), whereas above, the subscripts represent the nature of the contact. Because $n_g N_{gh} = n_h N_{hg}$, one or more embodiments of the invention may not require the specification of $N_{hg}$. Alternatively, another variable may be omitted from specification.

6) Distribution functions for the coordination numbers of each type of particle contact (grain-grain, grain-hydrate, hydrate-grain, hydrate-hydrate). At the time of this writing, no theory has been developed for the distributed coordination numbers of multicomponent particulate systems, and few experiments have been performed to measure these distributions. See, e.g., Pinson, D., Zou, R. P., Yu, A. B., Zulli, P. & McCarthy, M. J. (1998) Coordination number of binary mixtures of spheres. J. Phys. D, 31, 457-462. Thus, only the mean values of these distributions ($N_{gg}$, $N_{gh}$, and $N_{hh}$) may be specified. In other words, the roles of higher order moments may be neglected. However, if a theory for the distributed coordination numbers of multicomponent particulate systems is developed, the theory may be used to obtain the distributed coordination numbers.

7) The normal and shear elastic stiffnesses of particulate contacts. Generally, these elastic stiffnesses vary from contact to contact, depending on the applied stress and the material properties of the particles making contact. However, these stiffnesses may be assumed to be known if the elastic properties of the grains are known and sufficient information exists to calculate the stresses at each contact. For example, this assumption may be made if the geometrical structure of the multicomponent particulate system and confining pressure are defined. In one or more embodiments, the variables discussed above ($N_{gg}$, $N_{gh}$, $N_{hh}$, $n_h$, $n_g$, $d_g$, and $d_h$) may be considered sufficient to define the geometrical structure of the multicomponent particulate system. Thus, the additional variables required to specify the normal and shear elastic stiffnesses of particulate contacts, are Young's moduli for the grain and hydrate ($E_g$, $E_h$); Poisson's ratios for the grain and hydrate ($v_g$, $v_h$); and confining pressure ($p_c$).

For the purposes of this discussion, clathrate hydrate content is excluded from the list of physical attributes under consideration. Clathrate hydrate content affects deformation insofar as it exerts control over physical properties that are already included in the list.

In one or more embodiments, the multicomponent particulate system may be assumed to deform plastically via sliding at grain contacts. Accordingly, the contribution of particle rotation to deformation may be ignored. Rolling contact, rather than sliding contact, is expected to dominate the final stages of shear banding. See, e.g.: Bardet, J. P. & Proubet, J. (1991) A numerical investigation of the structure of persistent shear bands in granular media. *Geotechnique*, 41, 599-613; and Tordesillas, A. & Walsh, S. (2002) Incorporating rolling resistance and contact anisotropy in micromechanical models of granular media. *Powder Technology*, 124, 106-111. Alternatively, particle rotation may be incorporated into the analysis by specifying additional parameters to describe the rolling resistance and rotational stiffness at contacts.

Based on the discussion above, a macroscopic property $\eta$ that governs elastoplastic deformation may be considered to depend on the following parameters:

$$\eta = \eta(d_g, d_h, \rho_g, \rho_h, \rho_b, E_g, E_h, v_g, v_h, \mu_{gg}, \mu_{gh}, \mu_{hh}, c_{gh}, c_{hh}, N_{gg}, N_{gh}, N_{hh}, n_g, n_h, p_c) \quad (1)$$

Further, equation (1) may be modified based on the following relations, where $\phi$ is porosity and $s_{hyd}$ is hydrate saturation:

$$(1 - \varphi) = \frac{1}{6}\pi d_g^3 n_g \quad (2)$$

$$\varphi s_{hyd} = \frac{1}{6}\pi d_h^3 n_h \quad (3)$$

$$\rho_b = (1 - \varphi)\rho_g + s_{hyd}\varphi\rho_h \quad (4)$$

Accordingly, using equations (2), (3) and (4) to eliminate $n_g$, $d_h$ and $\rho_h$ in equation (1) yields:

$$\eta = \eta(d_g, s_{hyd}, \rho_g, \rho_b, E_g, E_h, v_g, v_h, \mu_{gg}, \mu_{gh}, \mu_{hh}, c_{gh}, c_{hh}, N_{gg}, N_{gh}, N_{hh}, \phi, n_h, p_c) \quad (5)$$

The choice of which variables to eliminate in equation (5) is not unique. Equation (5) defines variables that control elastoplastic properties of the multicomponent particulate system, including acoustic velocities which may be expressed as follows:

$$V_p = V_p(d_g, s_{hyd}, \rho_g, \rho_b, E_g, E_h, v_g, v_h, N_{gg}, N_{gh}, N_{hh}, \phi, n_h, p_c) \quad (6)$$

$$V_s = V_s(d_g, s_{hyd}, \rho_g, \rho_b, E_g, E_h, v_g, v_h, N_{gg}, N_{gh}, N_{hh}, \phi, n_h, p_c) \quad (7)$$

where $V_p$ is the compressional wave velocity and $V_s$ is the shear wave velocity.

In this example, both acoustic velocities are frame velocities. Further, where necessary, acoustic velocities measured in fluid-saturated sediments may be corrected using Gassman's relations or any other similar method. See, e.g., Mavko, G., Mukeii, T., & Dvorkin, J. (1998) *The Rock Physics Handbook*. Cambridge University Press. p. 329. In equations (6) and (7), acoustic waves are assumed to induce strains that are too small to produce slip at contacts. Therefore, $V_p$ and $V_s$ may be considered independent of the cohesive and frictional properties at contacts.

Continuing with the example above, it may be assumed that equation (6) can be inverted for $N_{gg}$. Specifically, if all the other variables in equation (6) are fixed, a one-to-one relation between $V_p$ and $N_{gg}$ may be assumed. This assumption is physically reasonable, because $V_p$ is expected to increase monotonically with $N_{gg}$. Consequently $N_{gg}$ may be replaced in equation (5) by $V_p$ so that:

$$\eta = \eta(d_g, s_{hyd}, \rho_g, \rho_b, E_g, E_h, v_g, v_h, \mu_{gg}, \mu_{gh}, \mu_{hh}, c_{gh}, c_{hh}, V_p, N_{gh}, N_{hh}, \phi, n_h, p_c) \quad (8)$$

In one or more embodiments, $V_s$ may be substituted for $V_p$. Further, at low hydrate saturations, mechanical properties may be considered independent of the properties of the hydrate. This assumption is expected to apply if the hydrates grow in the pore space rather than in the grain contact region after nucleation. Consequently, equation (8) may be reduced to:

$$\eta_{low} = \eta_{low}(d_g, \rho_g, \rho_b, E_g, v_g, \mu_{gg}, V_p, \phi, p_c) \quad (9)$$

However, at moderate to high hydrate saturations, hydrate particles become load bearing and the geometrical and physical properties of the hydrate particles become important. In such circumstances, $V_s$ may be sensitive to these properties.

Further, it may be assumed that equation (7) can be inverted for $N_{hh}$. That is, if all the other variables in equation (7) are fixed, a one-to-one relation between $V_s$ and $N_{hh}$ may exist. This one-to-one relationship is again physically reasonable, because $V_s$ is expected to increase monotonically as the number of contacts between neighboring hydrate particles increases. Consequently, $N_{hh}$ may be replaced in equation (8) by $V_s$ so that:

$$\eta_{high} = \eta_{high}(d_g, s_{hyd}, \rho_g, \rho_b, E_g, E_h, v_g, v_h, \mu_{gg}, \mu_{gh}, \mu_{hh}, c_{gh}, c_{hh}, V_p, N_{gh}, V_s, \phi, n_h, p_c) \quad (10)$$

Equations (9) and (10) are general relations that may be used for the construction of elastoplastic property correlations. However, these equations may be cumbersome to apply in some circumstances. Accordingly, the equations may be simplified to facilitate their application. The following is a discussion of one such set of simplifications. The following simplifications are provided for exemplary purposes only and should not be construed as limiting the scope of the invention.

As one example, equations (9) and (10) may be simplified by applying them to a given binary sediment-hydrate system (alternatively, equations (9) and (10) may be used to construct correlations for the combined data of several different binary systems). By virtue of assumptions discussed above, $d_g$, $r_g$, $E_g$, $E_h$, $v_g$, $v_h$, $\mu_{gg}$, $\mu_{gh}$, $\mu_{hh}$, $c_{gh}$, and $c_{hh}$ may be considered fixed for a given sediment-hydrate combination.

Eliminating $N_{gh}$ and $n_h$ from equation (10) may be desirable. At the time of this writing, exact theoretical expressions for the three mean partial coordination numbers ($N_{gg}$, $N_{gh}$, and $N_{hh}$) do not exist. However, approximate theoretical relations for the partial mean coordination numbers of multimodal particulate systems are described in: Dodds, J. A. (1980) The porosity and contact points in multicomponent random sphere packings calculated by a simple statistical geometric model. *J. Colloid Interface Sci.* 77, 317-327; Ouchiyama, N. & Tanaka, T. (1980) Estimation of the average number of contacts between randomly mixed solid particles. *Ind. Eng. Chem. Fundam.* 19, 338-340; and Suzuki, M. & Oshima, T. (1985) Co-ordination number of a multicomponent randomly packed bed of spheres with size distribution. *Powder Technol.* 44, 213.

An examination of the expressions developed by Ouchiyama & Tanaka (1980) (referenced above) reveals that $N_{gg}$, $N_{gh}$, and $N_{hh}$ may be modeled approximately as follows:

$$N_{gg}, N_{gh}, N_{hh} = f(n_g, n_h, d_h, d_g, \phi) \quad (11)$$

Further, $n_g$ and $d_h$ may be eliminated as before, using equations (2) and (3). Thus, equation (11) may be simplified as:

$$N_{gg}, N_{gh}, N_{hh} = f(n_h, s_{hyd}, d_g, \phi) \quad (12)$$

Moreover, due to the simplicity of the relations of Ouchiyama & Tanaka (1980) (referenced above), equation (12) may be inverted to obtain $n_h$ in terms of $N_{hh}$ so that:

$$n_h = n_h(N_{hh}, s_{hyd}, d_g, \phi) \quad (13)$$

Substituting equation (13) into equation (12) gives the following relation for $N_{gh}$:

$$N_{gh} = N_{gh}(N_{hh}, s_{hyd}, d_g, \phi) \quad (14)$$

Finally for this example, substituting equations (13) and (14) into equation (10) and making use of the fact that equation (7) may be inverted to give $N_{hh}$ in terms of $V_s$ gives:

$$\eta_{high} = \eta_{high}(d_g, s_{hyd}, \rho_g, \rho_b, E_g, E_h, v_g, v_h, \mu_{gg}, \mu_{gh}, \mu_{hh}, c_{gh}, c_{hh}, V_p, V_s, \phi, p_c) \quad (15)$$

Dimensional analysis may be employed to reduce the number of independent variables in equations (9) and (15). In general, the macroscopic property $\eta$ may be considered either dimensionless (e.g., Poisson's ratio, dilation angle) or having the dimensions of pressure (e.g., Young's modulus, unconfined compression strength (UCS), cohesion hardening parameters, etc.). For purposes of non-dimensionalization, $d_g$, $\rho_g$, and $V_p$ may be selected as scaling variables. However, other combinations of scaling variables may be used (e.g., $\{p_c, d_g, \rho_g\}$, $\{p_c, d_g, V_p\}$). Further, the resulting relations may be used exclusively or in combination with other relations.

With this choice of scaling variables, the terms $E_g$, $E_h$, $c_{gh}$, and $c_{hh}$ (which have dimensions of pressure) may be scaled by the quantity $\rho_g V_p^2$, leading to four dimensionless variables of the form $$\frac{c}{\rho_g V_p^2},$$

where c is constant for a fixed sediment-hydrate combination. However without loss of generality, all four variables may be replaced by a single variable $$c^* = \frac{c}{\rho_g V_p^2},$$

where c is an arbitrary scaling variable with dimensions of pressure.

Non-dimensionalizing may therefore lead to the following relations between dimensionless quantities:

$$\eta^*_{low} = \eta^*_{low}(\rho^*, c^*, v_g, \mu_{gg}, \phi, p^*_c) \quad (16)$$

$$\eta^*_{high} = \eta^*_{high}(s_{hyd}, \rho^*, c^*, v_g, v_h, \mu_{gg}, \mu_{gh}, \mu_{hh}, \gamma, \phi, p^*_c) \quad (17)$$

where $\eta^* = \eta/\rho_g V_p^2$ if $\eta$ has dimensions of pressure, $\eta^* = \eta$ if $\eta$ is dimensionless, $$\rho^* = \frac{\rho_b}{\rho_g}, \gamma = \frac{V_p}{V_s}, \text{ and } p^*_c = \frac{p_c}{\rho_g V_p^2}.$$

Equations (16) and (17) provide a basis for devising correlations between mechanical properties and geophysical data in a binary sediment-hydrate system. For a fixed sediment-hydrate combination, $v_g$, $v_h$, $\mu_{gg}$, $\mu_{gh}$, and $\mu_{hh}$ are fixed, so that correlations only need to be sought among the remaining variables. The independent variables, $s_{hyd}$, $\rho^*$, $c^*$, $\gamma$, $\phi$, and $p^*_c$ may all be measured or inferred from geophysical data.

Figure 4:
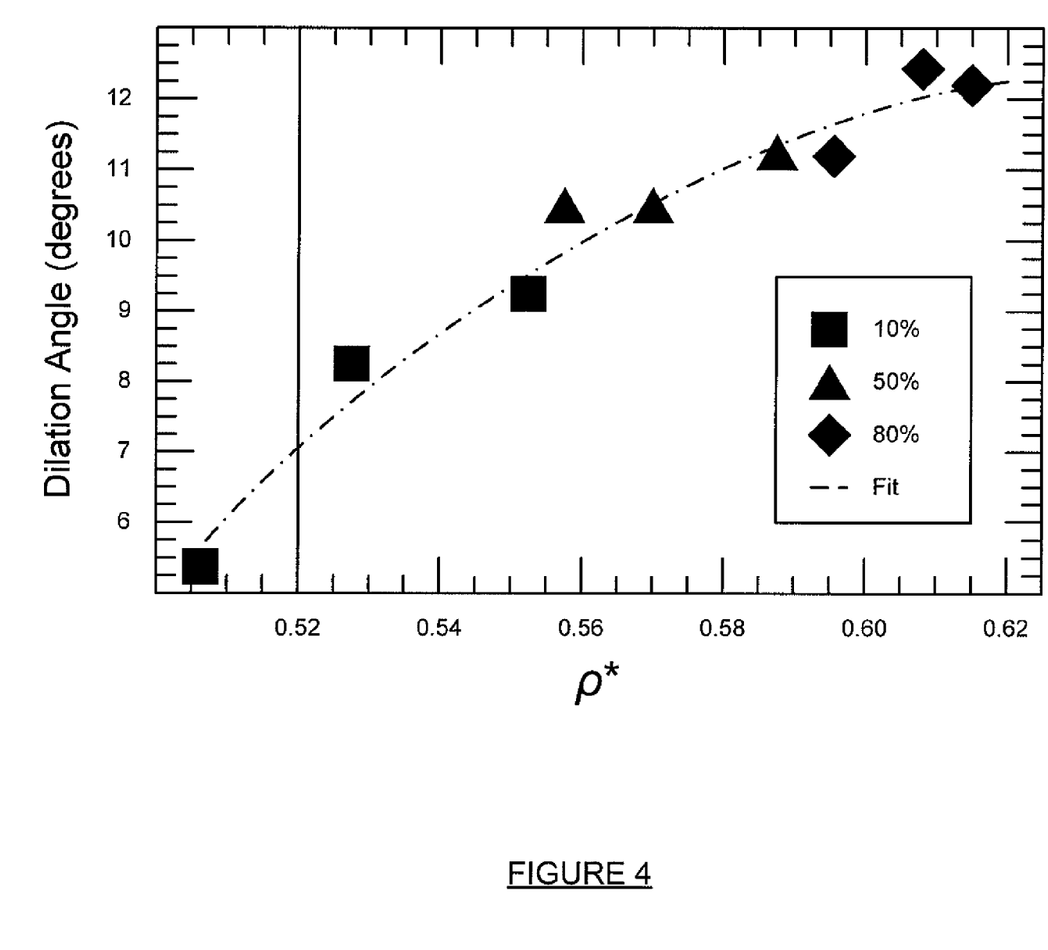
FIG. 4 shows a diagram of a correlation in accordance with one or more embodiments of the invention.

FIG. 4 shows a diagram of a correlation in accordance with one or more embodiments of the invention. Specifically, FIG. 4 shows a diagram of an exemplary correlation (broken dashed line) between the dilation angle and the dimensionless bulk density, ρ* constructed using hypothetical data, according to the exemplary equations discussed above. The dilation angle is a measure of the tendency of a solid to increase its volume when subject to shearing. In FIG. 4, hydrate saturation corresponds to data points shown in the legend. In practice, the data shown in FIG. 4 may be acquired using the following procedures. Samples of a hydrate bearing sediment are obtained either by coring formations of interest or by manufacturing synthetic substitutes in a laboratory. The properties $\rho_b$ and $\rho_g$ of the samples are measured in the laboratory and ρ* is calculated. The samples are then subjected to compression in a triaxial test device under various loading regimes. Stress-strain curves are plotted for the sample. The dilation angle is deduced from these stress-strain curves. A plot of dilation angle vs. ρ* is constructed and a curve is fitted to the points on the plot. The mathematical function describing this curve is in fact the correlation between the dilation angle and ρ*. Although a good correlation between the dilation angle and ρ* has been assumed in this example, in practice, a search is typically performed to find the combination of variables in equations (16) and (17) that correlate best. For example, it may turn out that the dilation angle correlates best with the product ρ*γ or with the three variables $s_{hyd}$,ρ* and φ. Those skilled in the art will appreciate that many types of correlations exist. The correlation shown in FIG. 4 is provided for exemplary purposes only and should not be construed as limiting the scope of the invention Embodiments of the invention allow for accurate prediction of mechanical properties of multicomponent particulate systems (for example, sediments that include clathrate hydrates). By accounting for mechanical effects in such systems, embodiments of the invention avoid inefficient operational practices associated with overly conservative mechanical failure models and elastic-brittle models. For example, embodiments of the invention may be used to forecast rock deformation or failure, and a drilling operation may be adjusted based on the forecast. More generally, embodiments of the invention allow a drilling operation to be adjusted to mitigate challenges associated with drilling in multicomponent particulate system.

Figure 5:
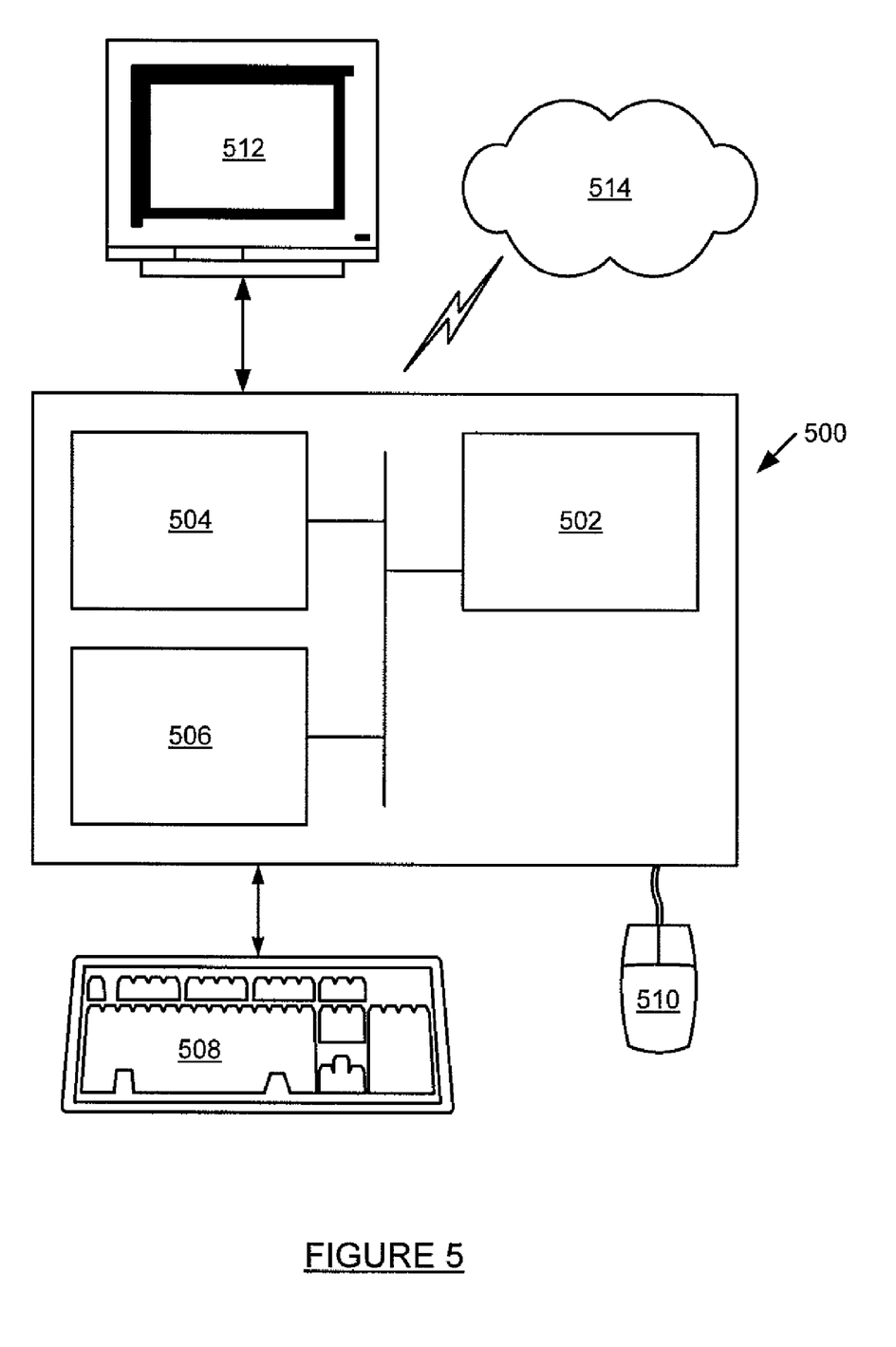
FIG. 5 shows a diagram of a computer system in accordance with one or more embodiments of the invention.

Embodiments of the invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) may be connected to a network (514) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., drilling component(s), data analysis system, measuring mechanism(s), etc.) may be located on a different node within the distributed system. In one embodiment of the invention, the node corresponds to a computer system. Alternatively, the node may correspond to a processor with associated physical memory. The node may alternatively correspond to a processor with shared memory or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a drilling operation in a multicomponent particulate system, comprising:
   obtaining a plurality of geophysical and petrophysical data associated with the multicomponent particulate system, wherein the plurality of geophysical and petrophysical data comprises:
   geophysical and petrophysical properties of a first type of particle in the multicomponent particulate system,
   acoustic velocities measured in the multicomponent particulate system, and
   effective confining pressure of the multicomponent particulate system;
   calculating at least one property corresponding to the plurality of geophysical and petrophysical data;
   obtaining at least one measurement of an elastoplastic property of the multicomponent particulate system;
   calculating at least one elastoplastic property of the multicomponent particulate system using the at least one measurement of the elastoplastic property of the multicomponent particulate system;
   constructing at least one correlation between the at least one elastoplastic property and the at least one property corresponding to the plurality of geophysical and petrophysical data;
   estimating at least one elastoplastic property of sediments in a formation of interest using the at least one correlation;
   evaluating mechanical integrity of the formation of interest using the at least one elastoplastic property of sediments; and
   adjusting the drilling operation based the evaluation.

2. The method of claim 1, wherein the multicomponent particulate system is a sediment-hydrate system.

3. The method of claim 2, wherein a form of the at least one correlation depends on a degree of hydrate saturation of the sediment-hydrate system.

4. The method of claim 2, wherein the first type of particle is a hydrate, and wherein the multicomponent particulate system includes a second type of particle that is a mineral grain.

5. The method of claim 4,
   wherein the plurality of geophysical and petrophysical data comprises ρ*, c*, φ, and $p^*_c$
   wherein ρ* is a first quotient obtained by dividing a dry aggregate density by a mineral grain density, c* is a second quotient obtained by dividing a scaling variable with dimensions of pressure by the mineral grain density and a square of a compressional wave velocity, φ is a porosity, and $p^*_c$ is a fourth quotient obtained by dividing a confining pressure by the mineral grain density and the square of the compressional wave velocity, and
   wherein calculating the at least one elastoplastic property is performed using an equation comprising $\eta^*_{low} = \eta^*_{low}(\rho^*, c^*, v_g, \mu_{gg}, \phi, p^*_c)$, wherein $\eta^*_{low}$ is the at least one elastoplastic property, $v_g$ is the Poisson's ratio of the mineral grain, and $\mu_{gg}$ is a grain-to-grain sliding friction coefficient.

6. The method of claim 5, wherein using the equation comprising $\eta^*_{low}=\eta^*_{low}(\rho^*, c^*, v_g, \mu_{gg}, \phi, p^*_c)$ is based on low hydrate saturation in the sediment-hydrate system.

7. The method of claim 4,
wherein the plurality of geophysical and petrophysical data comprises $s_{hyd}, \rho^*, c^*, \gamma, \phi$, and $p^*_c$,
wherein $s_{hyd}$ is a hydrate saturation, $\rho^*$ is a first quotient obtained by dividing a dry aggregate density by a mineral grain density, $c^*$ is a second quotient obtained by dividing a scaling variable with dimensions of pressure by the mineral grain density and a square of a compressional wave velocity, $\gamma$ is a third quotient obtained by dividing the compressional wave velocity by a shear wave velocity, $\phi$ is a porosity, and $p^*_c$ is a fourth quotient obtained by dividing a confining pressure by the mineral grain density and the square of the compressional wave velocity, and
wherein calculating the at least one elastoplastic property is performed using an equation comprising $\eta^*_{high}=\eta^*_{high}(s_{hyd}, \rho^*, c^*, v_g, v_h, \mu_{gg}, \mu_{gh}, \mu_{hh}, \gamma, \phi, p^*_c)$, wherein $\eta^*_{high}$ is the at least one elastoplastic property, $v_h$ is the Poisson's ratio of the hydrate, $\mu_{gh}$ is a grain-to-hydrate sliding friction coefficient, and $\mu_{hh}$ is a hydrate-to-hydrate sliding fiction coefficient.

8. The method of claim 7, wherein using the equation comprising $\eta^*_{high}=\eta^*_{high}(s_{hyd}, \rho^*, c^*, v_g, v_h, \mu_{gg}, \mu_{gh}, \mu_{hh}, \gamma, \phi, p^*_c)$ is based on moderate to high hydrate saturation in the sediment-hydrate system.

9. The method of claim 1, wherein the plurality of geophysical and petrophysical data further comprises geophysical and petrophysical properties of a second type of particle in the multicomponent particulate system.

10. The method of claim 9, wherein the multicomponent particulate system comprises more than two types of particles.

11. The method of claim 1, wherein the at least one elastoplastic property is unscaled.

12. The method of claim 1, wherein construction of the at least one correlation is performed using parameters associated with rotation of particles in the multicomponent particulate system.

13. A system associated with a drilling operation in a multicomponent particulate system, comprising:
at least one measuring mechanism configured to obtain a plurality of geophysical and petrophysical data associated with the multicomponent particulate system, wherein the plurality of geophysical and petrophysical data comprises:
geophysical and petrophysical properties of a first type of particle in the multicomponent particulate system,
acoustic velocities measured in the multicomponent particulate system, and effective confining pressure of the multicomponent particulate system; and
a data analysis system configured to:
calculate at least one property corresponding to the plurality of geophysical and petrophysical data;
obtain at least one measurement of an elastoplastic property of the multicomponent particulate system;
calculate at least one elastoplastic property of the multicomponent particulate system using the at least one measurement of the elastoplastic property of the multicomponent particulate system;
construct at least one correlation between the at least one elastoplastic property and the at least one property corresponding to the plurality of geophysical and petrophysical data;
estimate at least one elastoplastic property of sediments in a formation of interest using the at least one correlation; and
evaluate mechanical integrity of the formation of interest using the at least one elastoplastic property of sediments,
wherein the drilling operation is adjusted based on the evaluation.

14. The system of claim 13, wherein the multicomponent particulate system is a sediment-hydrate system.

15. The system of claim 14, wherein the data analysis system is configured to calculate the at least one elastoplastic property using different equations depending on a degree of hydrate saturation of the sediment-hydrate system.

16. The system of claim 14, wherein the first type of particle is a hydrate, and wherein the multicomponent particulate system includes a second type of particle that is a mineral grain.

17. The system of claim 16,
wherein the plurality of geophysical and petrophysical data comprises $\rho^*, c^*, \phi$, and $p^*_c$,
wherein $\rho^*$ is a first quotient obtained by dividing a dry aggregate density by a mineral grain density, $c^*$ is a second quotient obtained by dividing a scaling variable with dimensions of pressure by the mineral grain density and a square of a compressional wave velocity, $\phi$ is a porosity, and $p^*_c$ is a fourth quotient obtained by dividing a confining pressure by the mineral grain density and the square of the compressional wave velocity, and
wherein the data analysis system is configured to calculate the at least one elastoplastic property using an equation comprising $\eta^*_{low}=\eta^*_{low}(\rho^*, c^*, v_g, \mu_{gg}, \phi, p^*_c)$,
wherein $\eta^*_{low}$ is the at least one elastoplastic property, $v_g$ is the Poisson's ratio of the mineral grain, and $\mu_{gg}$ is a grain-to-grain sliding friction coefficient.

18. The system of claim 17, wherein using the equation comprising $\eta^*_{low}=\eta^*_{low}(\rho^*, c^*, v_g, \mu_{gg}, \phi, p^*_c)$ is based on low hydrate saturation in the sediment-hydrate system.

19. The system of claim 16,
wherein the plurality of geophysical and petrophysical data comprises $s_{hyd}, \rho^*, c^*, \gamma, \phi$, and $p^*_c$,
wherein $s_{hyd}$ is a hydrate saturation, $\rho^*$ is a first quotient obtained by dividing a dry aggregate density by a mineral grain density, $c^*$ is a second quotient obtained by dividing a scaling variable with dimensions of pressure by the mineral grain density and a square of a compressional wave velocity, $\gamma$ is a third quotient obtained by dividing the compressional wave velocity by a shear wave velocity, $\phi$ is a porosity, and $p^*_c$ is a fourth quotient obtained by dividing a confining pressure by the mineral grain density and the square of the compressional wave velocity, and
wherein the data analysis system is configured to calculate the at least one elastoplastic property using an equation comprising $\eta^*_{high}=\eta^*_{high}(s_{hyd}, \rho^*, c^*, v_g, v_h, \mu_{gg}, \mu_{gh}, \mu_{hh}, \gamma, \phi, p^*_c)$
wherein $\eta^*_{high}$ is the at least one elastoplastic property, $v_h$ is the Poisson's ratio of the hydrate, $\mu_{gh}$ is a grain-to-hydrate sliding friction coefficient, and $\mu_{hh}$ is a hydrate-to-hydrate sliding fiction coefficient.

20. The system of claim 19, wherein using the equation comprising $\eta^*_{high} = \eta^*_{high}(s_{hyd}, \rho^*, c^*, v_g, v_h, \mu_{gg}, \mu_{gh}, \mu_{hh}, \gamma, \phi, p^*_c)$ is based on moderate to high hydrate saturation in the sediment-hydrate system.

21. A computer readable medium comprising computer program code for managing a drilling operation in a multicomponent particulate system, the computer program code comprising instructions to:

obtain a plurality of geophysical and petrophysical data associated with the multicomponent particulate system, wherein the plurality of geophysical and petrophysical data comprises:

geophysical and petrophysical properties of a first type of particle in the multicomponent particulate system, acoustic velocities measured in the multicomponent particulate system, and effective confining pressure of the multicomponent particulate system;

calculate at least one property corresponding to the plurality of geophysical and petrophysical data;

obtain at least one measurement of an elastoplastic property of the multicomponent particulate system;

calculate at least one elastoplastic property of the multicomponent particulate system using the at least one measurement of the elastoplastic property of the multicomponent particulate system;

construct at least one correlation between the at least one elastoplastic property and the at least one property corresponding to the plurality of geophysical and petrophysical data;

estimate at least one elastoplastic property of sediments in a formation of interest using the at least one correlation;

evaluate mechanical integrity of the formation of interest using the at least one elastoplastic property of sediments; and adjust the drilling operation based the evaluation.

22. The computer readable medium of claim 21, wherein the multicomponent particulate system is a sediment-hydrate system.

23. The method of claim 22, wherein the instructions to calculate the at least one elastoplastic property comprise instructions to use different equations depending on a degree of hydrate saturation of the sediment-hydrate system.

24. The computer readable medium of claim 23, wherein the first type of particle is a hydrate, and wherein the multicomponent particulate system includes a second type of particle that is a mineral grain.

25. The computer readable medium of claim 21 wherein the instructions to calculate the at least one elastoplastic property comprise instructions to use parameters associated with rotation of particles in the multicomponent particulate system.

* * * * *